United States Patent
Kimbell (10) Patent No.: US 7,525,583 B2
(45) Date of Patent: Apr. 28, 2009

(54) DECREASING ALIASING IN ELECTRONIC IMAGES

(75) Inventor: Benjamin D. Kimbell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 11/056,474

(22) Filed: Feb. 11, 2005

(65) Prior Publication Data

US 2006/0181620 A1    Aug. 17, 2006

(51) Int. Cl.
*H04N 5/217* (2006.01)
*G03B 17/48* (2006.01)
*G03B 19/00* (2006.01)
*G06K 9/40* (2006.01)

(52) U.S. Cl. .................. 348/241; 396/429; 382/260; 382/261

(58) Field of Classification Search .......... 348/241, 348/234, 235, 272; 382/269, 254–275
See application file for complete search history.

(56) References Cited

U.S. PATENT DOCUMENTS

| | | | |
|---|---|---|---|
| 6,493,029 B1 * | 12/2002 | Denyer et al. ............... | 348/236 |
| 6,897,425 B2 * | 5/2005 | Osada ...................... | 250/208.1 |
| 6,958,772 B1 * | 10/2005 | Sugimori ................. | 348/222.1 |
| 2002/0041761 A1 * | 4/2002 | Glotzbach et al. ........... | 396/429 |
| 2003/0122937 A1 | 7/2003 | Guarnera et al. | |
| 2004/0061790 A1 * | 4/2004 | Tanji et al. ............... | 348/222.1 |
| 2004/0086188 A1 * | 5/2004 | Owada ...................... | 382/233 |
| 2005/0169551 A1 * | 8/2005 | Messing et al. ............. | 382/260 |

FOREIGN PATENT DOCUMENTS

| | | |
|---|---|---|
| JP | 2003230159 | 8/2003 |
| JP | 2006135564 | 5/2006 |

OTHER PUBLICATIONS

U.S. Appl. No. 10/835,609 filed Apr. 29, 2004 for "Edge-Sensitive Denoising and Color Interpolation of Digital Images" of Renato Keshet et al.

* cited by examiner

*Primary Examiner*—Sinh N Tran
*Assistant Examiner*—Christopher K Peterson (57) ABSTRACT

A method for decreasing aliasing in an electronic image includes estimating an amount of aliasing in a first channel in the electronic image based on luminosity values in a second channel in the electronic image, and processing the first channel based on the estimated amount of aliasing to decrease aliasing in the first channel.

15 Claims, 5 Drawing Sheets

DECREASING ALIASING IN ELECTRONIC IMAGES

BACKGROUND

Electronic imaging devices such as digital cameras are used in a wide range of applications and are steadily becoming less expensive and simpler to use. Electronic images have many advantages over film-based images that are causing the use of electronic imaging devices to rapidly increase. Electronic images may be stored indefinitely without the image degradation suffered by film-based images. Electronic images can be viewed immediately after capture and used in a variety of ways such as printing, posting to a web page on the World Wide Web, transmitting to others by electronic mail (email) or other means, etc. As the capacity of removable solid-state memories has increased and price has gone down, typical electronic imaging devices can now capture and store hundreds of electronic images. Electronic images can also be previewed and stored or deleted in the electronic imaging device as desired.

Electronic imaging devices, such as digital cameras, typically convert light to electrical signals using a two dimensional photodetector. Commonly used photodetectors contain a two dimensional array of millions of light-sensitive cells, each capturing one picture element (or pixel) of an image. As an image is focused onto the photodetector, an electrical charge builds up in the photodetector cells. The magnitude of the electrical charge corresponds to the intensity of the image light—brighter light generates a larger electrical charge. Thus, the image light focused on the photodetector generates a pattern of varying electrical charges across the photodetector. The magnitude of the electrical charges across the photodetector are analyzed and stored in the electronic imaging device as an electronic representation of the image. In an electronic imaging device such as a digital camera, the magnitudes of the electrical charges are converted into numerical data in an analog to digital (A/D) converter.

One weakness of photodetectors is that they are susceptible to aliasing, causing incorrect colors or structure in the final image in high frequency regions. If the image contains fine detail causing pixel values to vary widely from one pixel to the next, this high frequency content may be missed or misinterpreted by the photodetector. Color errors are a particularly common type of aliasing. Conventional electronic images represent color by providing a red (R), green (G) and blue (B) color value for each pixel, which are combined when displayed or printed to produce the actual color for that location. However, commonly used photodetectors do not measure a red, green and blue value at each pixel. Rather, color photodetectors typically include a color filter over each pixel so that each captures only one of the three colors. The two missing color values for each pixel are estimated based on neighboring pixels. If the fine detail of the image lands only on one pixel and not its neighbors, the estimation of the two missing color values for that pixel will be incorrect. Thus, the discrete nature and the limited number of pixels, and the fact that each pixel is filtered to sample only one color, may result in aliasing.

BRIEF DESCRIPTION OF THE DRAWINGS

Illustrative embodiments are shown in the accompanying drawings as described below.

DESCRIPTION

Figure 1A:
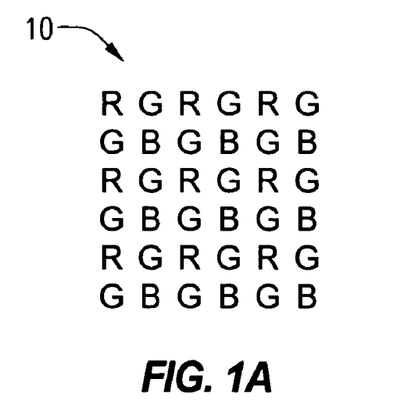
FIGS. 1A-1D are illustrations of a Bayer pattern array of color-filtered sensors in a region of a 6×6 pixel region of a photodetector, wherein the array of FIG. 1A contains red, green and blue color channels, the array of FIG. 1B contains the red color channel, the array of FIG. 1C contains the green color channel, and the array of FIG. 1D contains the blue color channel.

The drawing and description, in general, disclose a method and apparatus for decreasing chromatic aliasing in electronic images having mosaic image data in multiple color channels with unequal spatial frequencies. In one exemplary embodiment, the electronic images are captured by a digital camera having a photodetector with color-filtered sensors laid out in a Bayer pattern array 10, as illustrated in FIG. 1A. The image data therefore contains three color channels, a red channel 12 (illustrated in FIG. 1B), a green channel 14 (illustrated in FIG. 1C), and a blue channel 16 (illustrated in FIG. 1D). Note that the spatial frequency of the sensors in the green channel 14 is twice that of those in the red channel 12 or the blue channel 16. In the exemplary 6×6 pixel region illustrated in FIGS. 1A-1D, the green channel 14 contains 18 samples, and the red and blue channels 12 and 16 each contain 9 samples. In the Bayer pattern of the exemplary embodiment, fine detail such as narrow horizontal or vertical lines may fall into the rows (e.g., 20 and 22) or columns (e.g., 24 and 26) of the red and blue channels 12 and 16 containing no sensors. (Because of the higher spatial frequency of the sensors in the green channel 14, horizontal or vertical lines having a width of one pixel would be not be similarly missed.) An example of the color aliasing caused by fine detail may be understood by considering a white horizontal line falling across the bottom row 30 of the exemplary 6×6 pixel region. The white horizontal line will be detected by three green sensors and three blue sensors, but no red sensors. The white line will therefore appear to be a blue-green color rather than white in the electronic image.

Figure 1B:
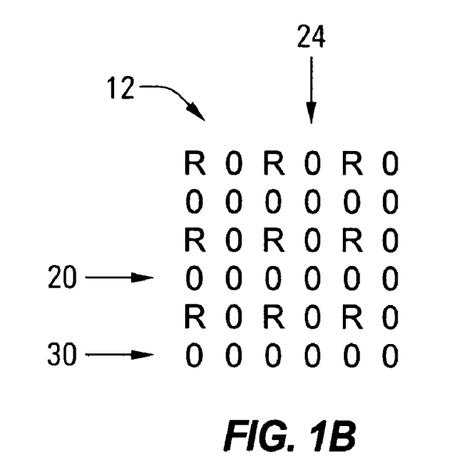
Figure 1C:
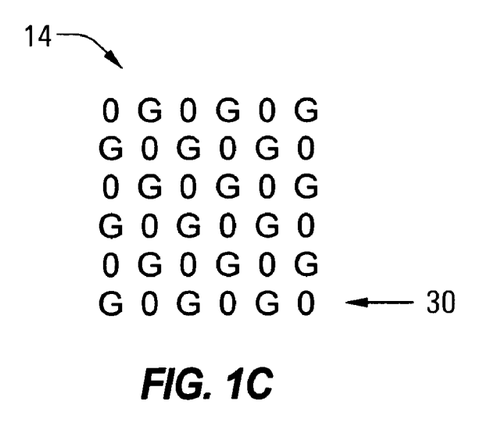
Figure 1D:
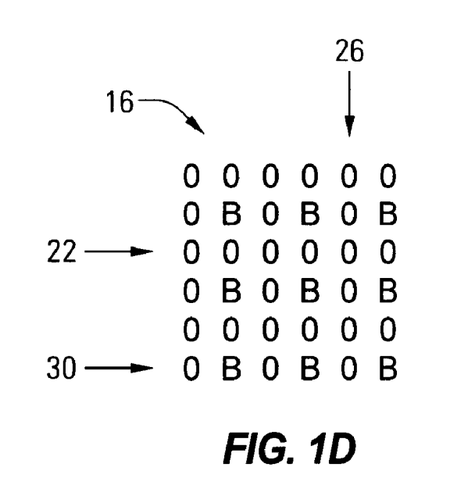

The method and apparatus for decreasing chromatic aliasing in electronic images uses the color channel having a higher spatial frequency to calculate models or estimates of the chromatic aliasing in other color channels. These models or estimates may then be applied to the image data in the other color channels to reduce chromatic aliasing in the electronic image. With respect to the exemplary white horizontal line described above, the green channel 14 would be used to calculate a model of the aliasing in the red channel 12. When applied to the image data in the red channel 12, this would effectively fill in the missing samples in the red channel 12 corresponding to the white line to some extent, causing the line to appear more white in the electronic image rather than blue-green.

The phrase "color channel having a higher spatial frequency" is used herein to refer to a color channel for which mosaic image data contains more measured luminosity values in a given region than in the compared color channel. After demosiacing or interpolation, all color channels may have the same spatial frequency of measured and interpolated luminosity values combined, but the phrase "color channel having a higher spatial frequency" as used herein is based on the frequency of just the measured luminosity values, rather than a combination of measured and interpolated luminosity values.

The method and apparatus for decreasing chromatic aliasing in electronic images may be adapted to other color encoding schemes than the red-green-blue (RGB) scheme of the exemplary embodiment, and to other photodetector mosaic patterns than the Bayer pattern of the exemplary embodiment. The method and apparatus for decreasing chromatic aliasing in electronic images described and claimed herein should therefore not be viewed as limited to the RGB encoding and Bayer pattern of the exemplary embodiment, but may be adapted as desired to any color encoding scheme or mosaic pattern now known or that may be developed in the future.

Although the method and apparatus for decreasing aliasing in electronic images is directed in one exemplary embodiment to chromatic aliasing in color channels of electronic images, the method and apparatus may be adapted to other types of aliasing and other types of data channels wherein one channel has a higher spatial frequency than another. Therefore, the term "luminosity" as used with respect to the exemplary embodiment refers to light intensity, but in alternative embodiments may refer to a magnitude of whatever the sensor or sensors detect.

The terms "mosaic image data" and "raw image data" are used herein to refer to image data, carried in multiple channels, having missing samples or luminosity values. In the exemplary embodiment described herein, this is raw image data from a photodetector according to the Bayer pattern, meaning that the missing luminosity values have not been filled in by interpolation or any other method.

Figure 2:
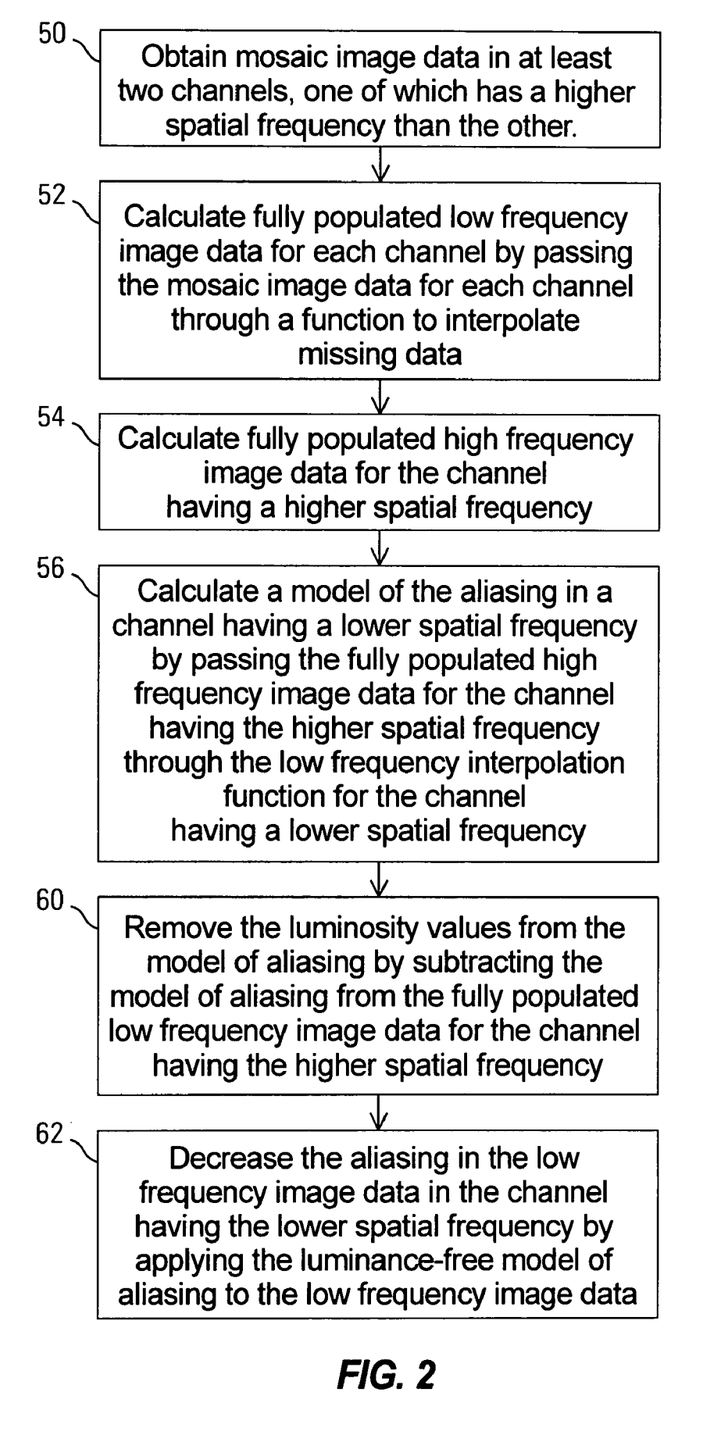
FIG. 2 is a flow chart of an exemplary operation for decreasing chromatic aliasing in an electronic image.

Referring now to FIG. 2, an exemplary operation for decreasing chromatic aliasing in an electronic image will be described. Mosaic image data is obtained 50 in at least two channels, one of which has a higher spatial frequency than the other. Fully populated low frequency image data for each channel is calculated 52 by passing the mosaic image data for each channel through a function to interpolate missing data. The term "fully populated" is used herein to refer to data having no missing samples. In the exemplary embodiment, each channel has its own interpolation function tailored to the mosaic pattern in the channel. Exemplary low pass filters to perform this interpolation, such as demosaicing, will be described in more detail below. High frequency content is filtered out of this fully populated low frequency image data for each channel because most aliasing addressed by the method and apparatus for decreasing chromatic aliasing occurs in the low frequency image data.

Fully populated high frequency image data is calculated 54 for the channel having the highest spatial frequency (or having a higher spatial frequency than the channel for which aliasing is being decreased). This is performed using the best possible demosaicing algorithm that may be reasonably performed by the device processing the image, in order to obtain the best possible model of aliasing. Alternatively, the cost of the demosaicing algorithm used to obtain high frequency image data may be balanced against the need to reduce aliasing, and a somewhat lower quality high frequency demosaicing algorithm selected if desired. The fully populated high frequency image data contains frequency content substantially similar to that in the raw image data, in that attempts are made to avoid low pass filtering of this data. Many algorithms are currently known for demosaicing image data without substantially removing high frequency content, and any suitable algorithm now known or that may be developed in the future may be used. One exemplary algorithm is described in commonly assigned U.S. patent application Ser. No. 10/835,609, filed Apr. 29, 2004, for "Edge-Sensitive Denoising and Color Interpolation of Digital Images", which is incorporated herein by reference for all that it discloses.

A model of the aliasing in a channel having a lower spatial frequency is calculated 56 by passing the fully populated high frequency image data for the channel having the higher spatial frequency through the low frequency interpolation function for the channel having a lower spatial frequency. As will be discussed in more detail, this creates an estimation of the same aliasing that takes place in the channel having a lower spatial frequency using image data in the channel having a higher spatial frequency.

The luminosity values are removed 60 from the model of aliasing by subtracting the model of aliasing from the fully populated low frequency image data for the channel having the higher spatial frequency. This results in a luminance-free model of aliasing. Finally, the aliasing is decreased or removed 62 from the low frequency image data in the channel having the lower spatial frequency by applying the luminance-free model of aliasing to the low frequency image data, such as by adding the model of aliasing to the low frequency image data. Note that the model of aliasing formed by this exemplary operation is an inverse map of aliasing, which is added to the low frequency image data for the channel having a lower spatial frequency, because of the order of the elements of the subtraction operation 56 when the exemplary model was created. The model of aliasing may alternatively be formed as a positive map of aliasing and combined with the low frequency image data in any suitable manner.

The resulting low frequency, low alias image data in the at least two channels may be used as desired to form the final electronic image. For example, high frequency image data, such as that calculated 54 above using the best possible demosaicing algorithm for the channel having the higher spatial frequency, may be combined with all channels of the low frequency, low alias image data to form the final electronic image.

Figure 3:
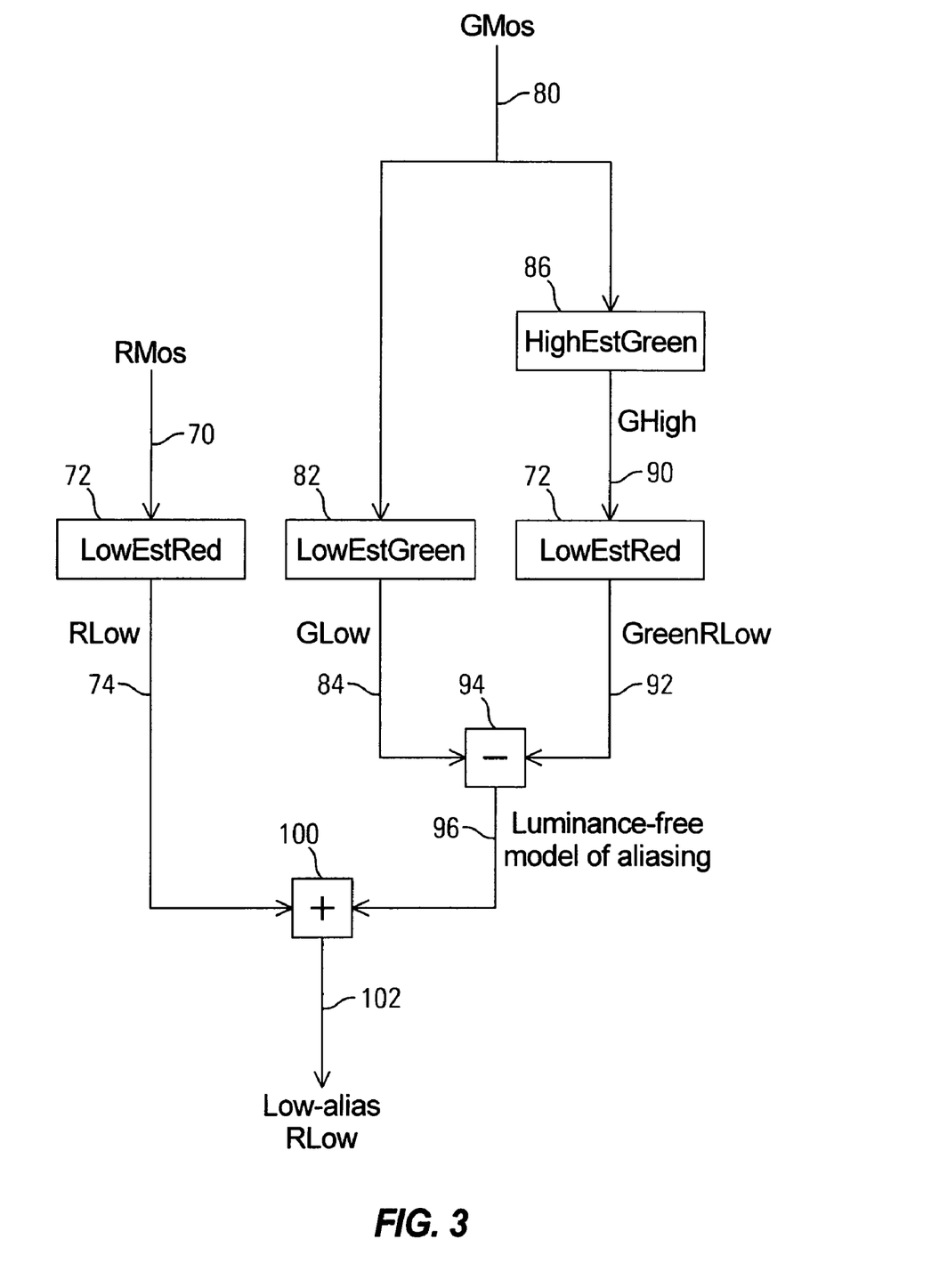
FIG. 3 is a block diagram of an exemplary operation for decreasing chromatic aliasing in a red channel of an electronic image using the green channel image data.

This operation is illustrated in the block diagram of FIG. 3 for green and red channels in an electronic image based on Bayer patterned mosaic image data. As described above, the green channel has a higher spatial frequency than the red channel. The green channel is therefore used to create the model of the aliasing in the red channel to decrease chromatic aliasing in the red channel. The red channel mosaic image data RMos 70 is passed through a low frequency interpolation function LowEstRed 72 to form fully populated, low frequency red channel image data RLow 74. This image data RLow 74 contains aliasing as described above, added by the low frequency interpolation function LowEstred 72, due to the low spatial frequency of the red channel mosaic image data. The green channel mosaic image data GMos 80 is also passed through a low frequency interpolation function LowEstGreen 82 to form fully populated, low frequency green channel image data GLow 84. The interpolation functions LowEstRed 72 and LowEstGreen 82 are tailored to the mosaic pattern of their corresponding color channels, as will be discussed in more detail below. Note that the low frequency green channel image data GLow 84 contains lower aliasing than the low frequency red channel image data RLow 74 based on the higher spatial frequency of the green channel.

The green channel mosaic image data GMos 80 is also passed through the best possible demosaicing algorithm HighEstGreen 86 to form high frequency green channel image data GHigh 90, having low aliasing and a high frequency content substantially similar to that in the raw mosaic image data. An estimation of the aliasing in the low frequency red channel image data RLow 74 is effectively introduced into the green channel data by passing the high frequency green channel image data GHigh 90 through the red channel low frequency interpolation function LowEstRed 72 (or at least through the same algorithm). As will be discussed in more detail below with respect to the low frequency interpolation functions, samples are dropped from the good high frequency green image data GHigh 90 in the red channel low frequency interpolation function LowEstRed 72 according to the Bayer pattern for the red channel. This effectively reduces the spatial frequency in the green channel data GHigh 90 to match that in the red channel, producing a model of aliasing GreenRLow 92. By dropping samples from the green channel in all locations except those corresponding to red pixels in the red channel, the model of aliasing GreenRLow 92 models the same aliasing as in the red channel, but it is in the green channel. Thus, the model of aliasing GreenRLow 92 contains red channel aliasing but has green channel luminosity values. (The naming convention used in the term "GreenRLow" indicates that GreenRLow 92 contains green luminosity values based on red pixel locations.)

To remove the green luminosity values from the model of aliasing GreenRLow 92 so that it may be applied to the low frequency red channel image data RLow 74, the model of aliasing GreenRLow 92 is subtracted 94 from the low frequency green channel image data GLow 84. The low frequency green channel image data GLow 84 contains low or no aliasing as discussed above, but contains green luminosity values at all pixel locations of the electronic image. By subtracting GreenRLow 92 from GLow 84, the green luminosity values cancel and are removed, leaving a luminance-free model 96 of the aliasing in the red channel. As discussed above, this luminance-free model 96 is an inverse map of the aliasing in the red channel. The aliasing in the red channel is decreased or removed from the low frequency red channel image data RLow 74 by adding 100 the luminance-free model of aliasing 96 to RLow 74, creating a low-alias low frequency red channel 102.

The exemplary operation for decreasing chromatic aliasing uses high frequency green channel image data GHigh 90 rather than just the low frequency green channel image data GLow 84 because GLow 84 would not estimate the aliasing. Because it has already been passed through LowEstGreen 82, it has lost the high frequency content missing from the red and blue channel that causes the chromatic aliasing.

The exemplary operation illustrated in FIG. 3 may be repeated for the blue channel in the electronic image, with the model of aliasing for the blue channel being based on high frequency green channel image data that is passed through the blue channel low frequency interpolation function LowEstBlue.

The general equations used in the exemplary operation described above are as follows:

RLow=LowEstRed(RMos)

GLow=LowEstGreen(GMos)

BLow=LowEstBlue(BMos)

GHigh=HighEstGreen(GMos)

GreenRLow=LowEstRed(GHigh)

GreenBLow=LowEstBlue(GHigh)

LowAliasRLow=RLow+GLow−GreenRLow

LowAliasBLow=BLow+GLow−GreenBLow

RMos, GMos and BMos are mosaic image data for the red, green and blue color channels, respectively.

RLow and BLow are fully populated low frequency red and blue channels, respectively, having potentially high aliasing.

GLow is a fully populated low frequency green channel having low aliasing.

GHigh is a fully populated high frequency green channel, also having low aliasing.

GreenRLow and GreenBLow are green channel models of the aliasing in the red and blue channels, respectively, and having green channel luminosities.

The final equation for LowAliasRLow is therefore red channel luminosity, with red channel type aliasing (RLow), plus green channel luminosity (GLow), minus green channel luminosity and red channel type aliasing (GreenRLow). The green channel luminosities cancel, leaving red channel luminosity with red channel type aliasing minus red channel type aliasing. The red channel type aliasing cancels, for a final result of red channel luminosity only without the aliasing. Similarly, the final equation for LowAliasBLow is blue channel luminosity, with blue channel type aliasing (BLow), plus green channel luminosity (GLow), minus green channel luminosity and blue channel type aliasing (GreenBLow). The green channel luminosities cancel, leaving blue channel luminosity with blue channel type aliasing minus blue channel type aliasing. The blue channel type aliasing cancels, for a final result of blue channel luminosity only without the aliasing.

Exemplary low frequency interpolation functions LowEstRed, LowEstGreen and LowEstBlue will now be described generically using MATLAB instructions to illustrate the algorithms. The interpolation functions apply a low pass filtering matrix K to the input data, where:

$K=[1\ 3\ 4\ 3\ 1]'*[1\ 3\ 4\ 3\ 1]./36;$

This equation expands to the following matrix:

$$K = \begin{bmatrix} 0.0278 & 0.0833 & 0.1111 & 0.0833 & 0.0278 \\ 0.0833 & 0.2500 & 0.3333 & 0.2500 & 0.0833 \\ 0.1111 & 0.3333 & 0.4444 & 0.3333 & 0.1111 \\ 0.0833 & 0.2500 & 0.3333 & 0.2500 & 0.0833 \\ 0.0278 & 0.0833 & 0.1111 & 0.0833 & 0.0278 \end{bmatrix}$$

In LowEstRed, set all of the locations corresponding to non-red sensors to 0, as in the following partial image data array:

$$rZeros = \begin{matrix} R & 0 & R & 0 & R \\ 0 & 0 & 0 & 0 & 0 \\ R & 0 & R & 0 & R \end{matrix}$$

Apply low pass filter K to the rZeros matrix, using the MATLAB fir filter function:

RLow=fir(rZeros,K);

In LowEstGreen, set all of the locations corresponding to non-green sensors to 0, as in the following partial image data array:

Apply low pass filter K/2 to the gzeros matrix:

$$gZeros = \begin{matrix} 0 & G & 0 & G & 0 \\ G & 0 & G & 0 & G \\ 0 & G & 0 & G & 0 \end{matrix}$$

GLow=fir(gZeros,$K$/2);

Note that matrix K is divided by two due to the higher spatial frequency of the green channel.

In LowEstBlue, set all of the locations corresponding to non-blue sensors to 0, as in the following partial image data array:

$$bZeros = \begin{matrix} 0 & 0 & 0 & 0 & 0 \\ 0 & B & 0 & B & 0 \\ 0 & 0 & 0 & 0 & 0 \end{matrix}$$

Apply low pass filter K to the bZeros matrix:

BLow=fir(bZeros,K);

The low frequency interpolation functions LowEstRed, LowEstGreen and LowEstBlue are applied to the entire image in each color channel, resulting in low frequency color channels containing little or no detail or strong edges, just smoothly changing luminosities for each color. The rZeros, gzeros and bzeros matrices are not limited to the small 5×3 portions displayed above, but extend over the entire image.

More detailed MATLAB code for an exemplary embodiment of the low frequency interpolation functions LowEstRed, LowEstGreen and LowEstBlue will now be described. In this MATLAB code, the three low frequency interpolation functions LowEstRed, LowEstGreen and LowEstBlue are combined in a single "smoothBilinear" function as follows:

function [RLow, GLow, BLow]=smoothBilinear($m$);

$K$=[1 3 4 3 1]'*[1 3 4 3 1]./36;

$p$=zeros(size($m$));

$p$(1:2:end, 2:2:end)=$m$(1:2:end, 2:2:end); % $G$1 pixels $p$(2:2:end, 1:2:end)=$m$(2:2:end, 1:2:end); % $G$2 pixels GLow=filter2($K$./2,$p$);

$p$=zeros(size($m$));

$p$(1:2:end, 1:2:end)=$m$(1:2:end, 1:2:end); % $R$ pixels

RLow=filter2($K$,$p$);

$p$=zeros(size($m$));

$p$(2:2:end, 2:2:end)=$m$(2:2:end, 2:2:end); % $B$ pixels

BLow=filter2($K$,$p$);

The low pass filtering matrix K is set up as described above. A matrix p is established with the size of the electronic image. The mosaic image data is provided in input matrix m, which contains all three color channels merged together as illustrated in FIG. 1A. The green channel pixels are copied from the input matrix m into the matrix p, leaving the red and blue pixel locations in matrix p with zero values as initialized as illustrated in FIG. 1C. The low pass filter matrix K (divided by two because of the high relative spatial frequency of the green channel) is applied to matrix p in the filter2 function. For each pixel in matrix p lacking a measured luminosity, the filter2 function multiplies each neighboring measured luminosity value by the corresponding coefficient in matrix K, then sums the resulting values to form the missing luminosity value. The filter2 function fills in only missing luminosity values, and does not overwrite the measured luminosity values. The process is repeated for the red and blue channels, producing the fully populated low frequency red, green and blue channels for use in the method and apparatus for decreasing chromatic aliasing described above. Note that the low frequency interpolations described above are purely exemplary, and the method and apparatus for decreasing chromatic aliasing may use any suitable demosaicing and low pass filtering algorithm.

In one exemplary embodiment, the model of aliasing may be scaled before applying it to the channel having relatively low spatial frequency to decrease aliasing. Because the model of aliasing is based on luminosity values in the channel with higher spatial frequency, it may have a different effective gain than the luminosity values in the channel with lower spatial frequency to which it is applied. For example, the luminance-free model of red channel type aliasing (Glow-GreenRLow) 96 is based on green luminosity values, rather than red luminosity values. Although the green luminosity has been removed, the red channel type aliasing remaining is still scaled according to the green channel luminosity rather than the red channel luminosity. If the image contains a great deal of green light and very little red light, the luminance-free model of red channel type aliasing (Glow-GreenRLow) 96 may indicate a greater magnitude of aliasing than actually exists in the red channel. This may be compensated for by scaling the model of aliasing in any of a number of suitable methods. In one exemplary embodiment, the model of aliasing is globally scaled based on the channel balance for the target color channel, e.g., the gain needed in the red channel to meet the desired white balance for the image. In another exemplary embodiment when greater processing power is available, the model of aliasing may be locally scaled, e.g., based on the factor of red luminosity to green luminosity in that region.

The method and apparatus for decreasing aliasing in electronic images is applied on an image-by-image basis, for example, reducing the chromatic aliasing in the red and blue channels based on the green channel for each individual image. The method and apparatus for decreasing aliasing in electronic images may be performed on mosaic image data in any suitable device, such as in a digital camera as the image is captured, or in a computer, as long as the mosaic image data is contained in multiple channels with one having a higher spatial frequency than another.

With respect to the claimed method and apparatus for decreasing aliasing in an electronic image, it is important to note that the claims are not limited to processing only a single color channel, but may be applied to as many color channels as desired, such as the red and blue color channels in the exemplary embodiment described above.

Figure 4:
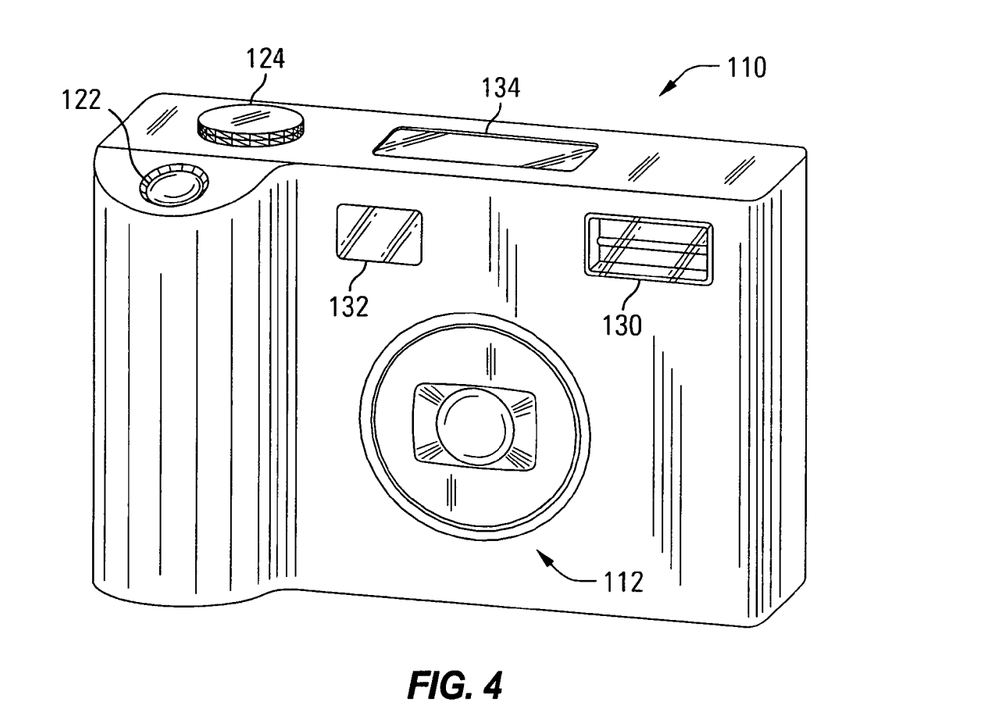
FIG. 4 is an isometric front view illustration of an exemplary electronic imaging device which may be used to decrease chromatic aliasing in an electronic image.
Figure 5:
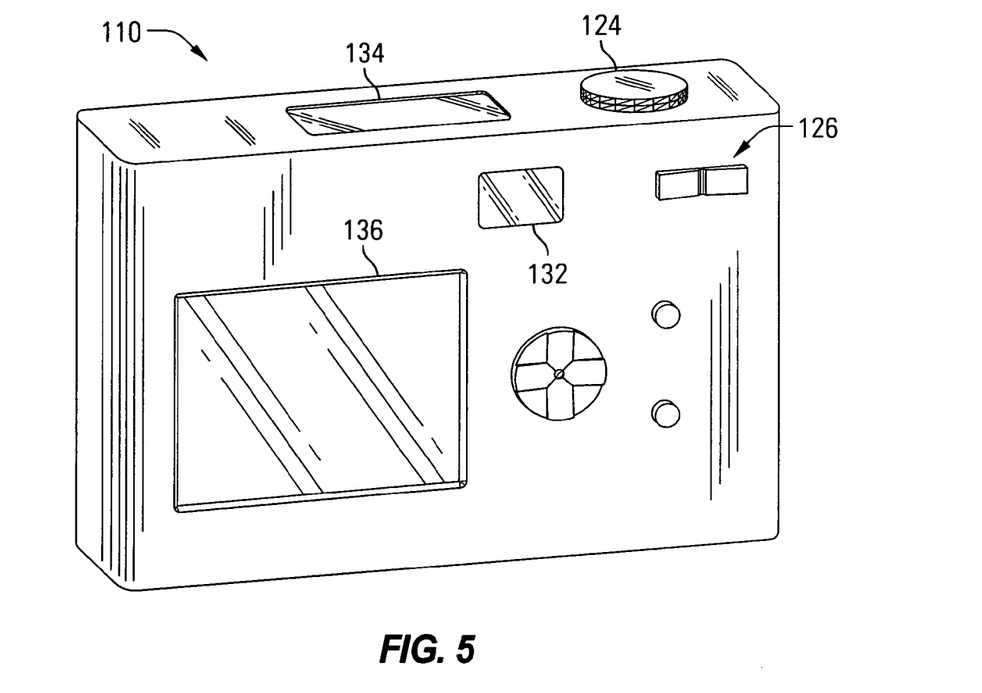
FIG. 5 is an isometric rear view illustration of the exemplary electronic imaging device of FIG. 4.
Figure 6:
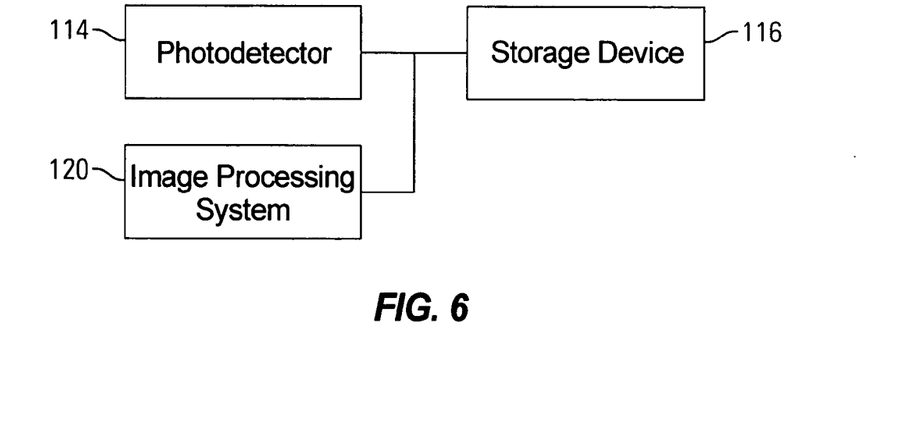
FIG. 6 is a block diagram of an exemplary electronic imaging device which may be used to decrease chromatic aliasing in an electronic image.

An exemplary digital camera in which the method and apparatus for decreasing aliasing may be embodied is illustrated in FIGS. 4-6. The exemplary digital camera 110 includes a lens assembly 112, a photodetector 114, a storage device 116 to store the image data collected by the photodetector 114, and an image processing system 120 to process and format the image data. The lens assembly 112 focuses light on the photodetector 114 in the digital camera 110. The digital camera 110 may include other elements such as control buttons (e.g., 122, 124, 126, etc.), a flash 130, a viewfinder 132 and display devices 134 and 136 as is well known.

The photodetector 114 may comprise any suitable sensor array for producing mosaic image data in multiple channels having at least two different spatial frequencies. For example, the photodetector 114 may comprise a charge-coupled device (CCD) or a complementary metal-oxide semiconductor (CMOS) sensor, etc.

The image processing system 120 may comprise any suitable device for processing an electronic image to reduce aliasing and to perform other desired tasks. For example, the image processing system 120 may comprise a microprocessor and associated memory, with the apparatus for decreasing aliasing comprising executable program code stored in firmware form. Alternatively, the image processing system 120 may comprise a hard-coded device such as an application specific integrated circuit (ASIC). The digital camera 110 may be designed to decrease aliasing in an electronic image as it is captured or at a later time as desired.

Figure 7:
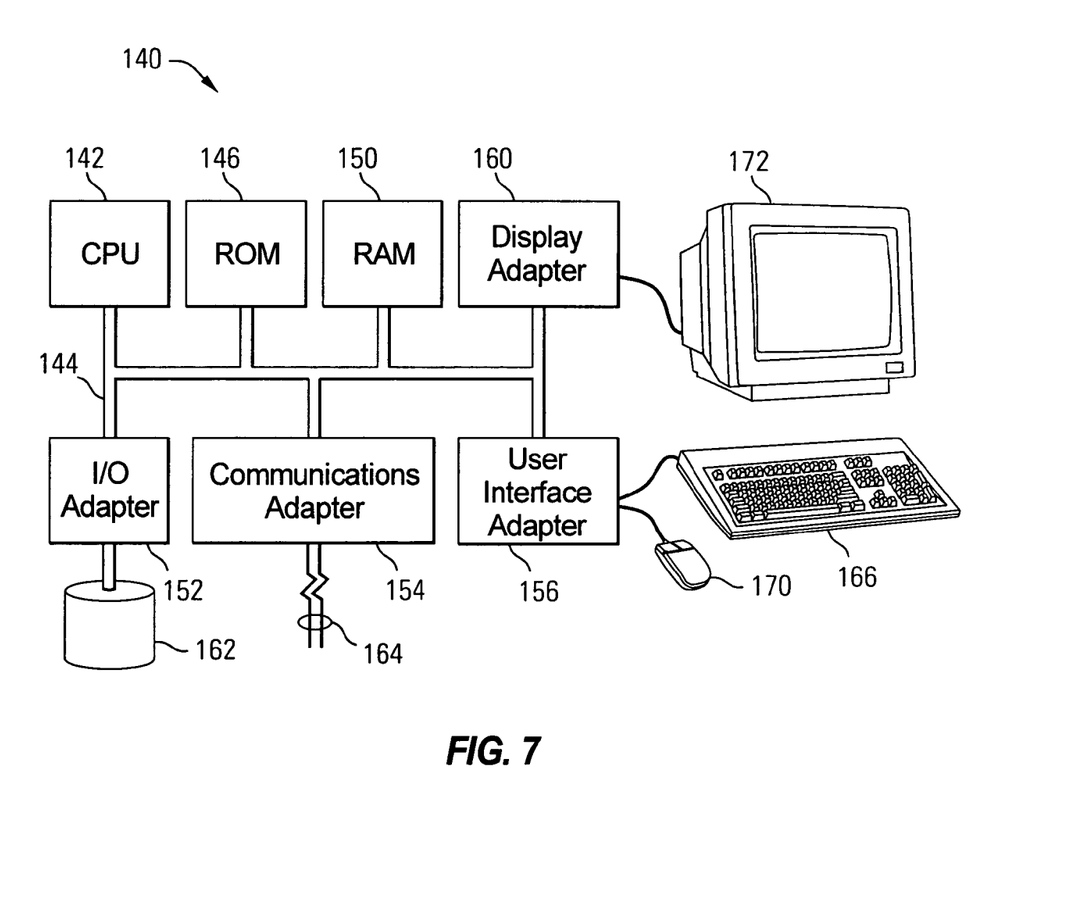
FIG. 7 is a block diagram of an exemplary computer system which may be used to decrease chromatic aliasing in an electronic image.

In another exemplary embodiment, the method and apparatus for decreasing aliasing may be embodied in a computer system. A typical computer system which may be used to decrease aliasing in an electronic image is illustrated in the block diagram of FIG. 7. The computer system 140 includes a central processing unit (CPU) 142 connected by a system bus 144 to devices such as a read-only memory (ROM) 146, a random access memory (RAM) 150, an input/output (I/O) adapter 152, a communications adapter 154, a user interface adapter 156, and a display adapter 160. Data storage devices such as a hard drive 162 are connected to the computer system 140 through the I/O adapter 152. In operation, the CPU 142 in the computer system 140 executes instructions stored in binary format on the ROM 146, on the hard drive 162, and in the RAM 150, causing it to manipulate data stored in the RAM 150 to perform useful functions. The computer system 140 may communicate with other electronic devices through local or wide area networks (e.g., 164) connected to the communications adapter 154. User input is obtained through input devices such as a keyboard 166 and a pointing device 170 which are connected to the computer system 140 through the user interface adapter 156. Output is displayed on a display device such as a monitor 172 connected to the display adapter 160. Aliasing may be decreased in an electronic image on such a computer system 140, or any other suitably configured processing system.

Various computer readable or executable code or electronically executable instructions have been referred to herein. These are implemented in any suitable manner, such as software, firmware, hard-wired electronic circuits, or as the programming in a gate array, etc. Software is be programmed in any programming language, such as machine language, assembly language, or high-level languages such as C or C++. The computer programs are interpreted or compiled.

Computer readable or executable code or electronically executable instructions is tangibly embodied on any computer readable medium or in any electronic circuitry for use by or in connection with any instruction-executing device, such as a general purpose processor, software emulator, application-specific circuit, a circuit made of logic gates, etc.

Methods described and claimed herein are performed by the execution of computer readable or executable code or electronically executable instructions, tangibly embodied on any computer readable medium or in any electronic circuitry as described above.

A computer readable medium for tangibly embodying computer readable or executable code or electronically executable instructions includes any means that can store instructions for use by or in connection with the instruction-executing device. For example, the computer readable medium may include (but is not limited to) any electronic, magnetic, optical, or other storage device. The computer readable medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, and non-volatile memories (NVMs), While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method of decreasing aliasing in an electronic image, comprising:

estimating an amount of aliasing in a first channel in said electronic image based on luminosity values in a second channel in said electronic image;

processing in an image processing system said first channel based on said estimated amount of aliasing to decrease aliasing in said first channel;

obtaining raw image data in said first and second channels for said electronic image, said raw image data having missing luminosity values in each of said first and second channels; and calculating in the image processing system said missing luminosity values in each of said first and second channels using an interpolation function for each of said first and second channels, wherein said estimating comprises calculating a difference between luminosity values in said second channel obtained from said interpolation function for said second channel and luminosity values in said second channel obtained from said interpolation function for said first channel, and wherein said luminosity values in said second channel obtained from said interpolation function for said first channel are obtained by passing fully populated image data for said second channel through said interpolation function for said first channel, wherein said fully populated image data have no missing luminosity values.

2. The method of claim 1, said fully populated image data comprising luminosity values for said second channel generated based on said raw image data for said second channel using an interpolation function for said second channel that maintains high frequency components of said electronic image substantially similar to those in said raw image data for said second channel.

3. The method of claim 1, said interpolation functions for said first and second channels comprising low pass filters designed to fill in said missing luminosity values based on neighboring luminosity values present in said raw image data for the associated channel.

4. The method of claim 1, said first channel comprising a color channel being selected from a group consisting of a red channel and a blue channel, and said second channel comprising a green color channel, said raw data comprising Bayer pattern image data for said electronic image.

5. The method of claim 1, further comprising scaling said estimated amount of aliasing before said processing said first channel.

6. An apparatus for reducing aliasing in an electronic image, comprising:
  a. at least one computer readable medium; and wherein
  b. the computer readable medium has instructions encoded thereon, which, when executed by a computer, cause the computer to perform a method comprising:
    i. demosaicing said mosaic image data to produce low frequency image data for said first channel and high frequency image data for said second channel, wherein said high frequency image data for said second channel contain higher frequency image content than said low frequency image data for said first channel;
    ii. passing said high frequency image data for said second channel through a same algorithm used to produce said low frequency image data for said first channel, producing a model of aliasing in said first channel; and
    iii. removing said model of aliasing from said low frequency image data for said first channel.

7. The apparatus of claim 6, wherein said mosaic image data for said second channel has a higher spatial frequency than said mosaic image data for said first channel.

8. The apparatus of claim 6, further comprising:
  iv. code for demosaicing said mosaic image data to produce low frequency image data for said second channel; and
  v. code for removing luminosity values for said second channel from said model of aliasing by subtracting said model of aliasing from said low frequency image data for said second channel and using a result as said model of aliasing.

9. The apparatus of claim 8, wherein said resulting model of aliasing comprises an inverse aliasing map, and wherein said code for removing said model of aliasing adds said inverse aliasing map to said low frequency image data for said first channel.

10. The apparatus of claim 8, wherein said code for producing said low frequency image data for said first and second channels comprises low pass filtering functions to interpolate missing luminosity values based on luminosity values present in said mosaic image data.

11. The apparatus of claim 6, wherein said high frequency image data for said second channel contain frequency content substantially similar to that in said mosaic image data for said second channel.

12. The apparatus of claim 6, wherein said mosaic image data comprise Bayer pattern data and said second channel comprises a green color channel.

13. The apparatus of claim 8, further comprising code for scaling said model of aliasing based on a channel balance for said first channel before said removing said model of aliasing.

14. The apparatus of claim 8, further comprising code for scaling said model of aliasing based on a ratio of localized luminosity values in said first channel and said second channel before said removing said model of aliasing.

15. The apparatus of claim 8, wherein said computer readable program code is adapted for execution on a digital camera.

* * * * *

UNITED STATES PATENT AND TRADEMARK OFFICE
CERTIFICATE OF CORRECTION

PATENT NO. : 7,525,583 B2  Page 1 of 1
APPLICATION NO. : 11/056474
DATED : April 28, 2009
INVENTOR(S) : Benjamin D. Kimbell

It is certified that error appears in the above-identified patent and that said Letters Patent is hereby corrected as shown below:

In column 9, line 56, after "Software is" delete "be".

In column 11, line 8, in Claim 6, after "medium;" delete "and".

Signed and Sealed this

Twenty-seventh Day of October, 2009

David J. Kappos
*Director of the United States Patent and Trademark Office*